(12) United States Patent
Gharachorloo et al.

(10) Patent No.: US 8,150,017 B2
(45) Date of Patent: Apr. 3, 2012

(54) PHONE DIALER WITH ADVANCED SEARCH FEATURE AND ASSOCIATED METHOD OF SEARCHING A DIRECTORY

(75) Inventors: Nader Gharachorloo, Ossining, NY (US); Donald H. Relyea, Dallas, TX (US); Brian Roberts, Frisco, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 935 days.

(21) Appl. No.: 12/171,748

(22) Filed: Jul. 11, 2008

(65) Prior Publication Data

US 2010/0008490 A1 Jan. 14, 2010

(51) Int. Cl.
*H04M 3/42* (2006.01)
(52) U.S. Cl. ............................. 379/216.01; 379/201.04
(58) Field of Classification Search ............. 379/216.01, 379/201.01, 201.04; 455/575.1, 414.1; 707/721; 1/1
See application file for complete search history.

(56) References Cited

U.S. PATENT DOCUMENTS

| | | | |
|---|---|---|---|
| 6,421,672 B1 * | 7/2002 | McAllister et al. .................. 1/1 |
| 6,502,090 B1 * | 12/2002 | Raisanen ...................... 707/721 |
| 6,823,183 B2 * | 11/2004 | Narusawa .................. 455/412.1 |
| 2007/0037613 A1 * | 2/2007 | Kim ........................... 455/575.1 |

* cited by examiner

*Primary Examiner* — Thjuan K Addy

(57) ABSTRACT

A method of retrieving a directory listing includes steps of storing a plurality of directory listings, each listing searchable by a plurality of keys, each of the keys comprising a plurality of symbols selected from a subset of an alphabet; receiving a sequence of inputs each designating a plurality of the symbols; identifying a number of the directory listings having at least one of the keys consistent with the sequence of inputs; displaying candidate ones of the directory listing having the at least one of the keys consistent with the sequence of inputs; and selecting one of the candidate directory listings to be contacted.

20 Claims, 11 Drawing Sheets

FIG. 2A

| TARGETED NAME | B | O | B |
|---|---|---|---|
| DIAL | 2 | 6 | 2 |
| LETTERS | ABC | MNO | ABC |
| CLICKS | 1 | 2 | 3 |
| HITS/OUT OF TOTAL | 55/150 | 10/150 | 2/150 |

PROG SPEED DIALS

| | | | |
|---|---|---|---|
| 1 A*JAY* WAGHRAY | AN*DREA* CUSTIS | BOB BUTLER | SUCCESS |
| 2 A*NDREA* CUSTIS | AN*IL* GUNTUPALLI | BOB SHAPIRO | |
| 3 AN*IL* GUNTUPALLI | AN*IL* SOLLETI | | |
| 4 AN*IL* SOLLETI | BO*B* BUTLER | | |
| 5 A*RAVIND* PERUMANDLA | BO*B* SHAPIRO | | |
| 6 A*SHOK* KUMAR | CO*LLEEN* CUNNIFFE | | |
| 7 B*ILL* STINSON | ANDERGEGGEN, SUSAN | | |
| 8 BO*B* BUTLER | BO*YLAN*, JOHN | | |

FIRST

| | | |
|---|---|---|
| 1 AJAY WAGHRAY | ANDREA CUSTIS | BOB BUTLER |
| 2 ANDREA CUSTIS | ANIL GUNTUPALLI | BOB SHAPIRO |
| 3 ANIL GUNTUPALLI | ANIL SOLLETI | |
| 4 ANIL SOLLETI | BOB BUTLER | |
| 5 ARAVIND PERUMANDLA | BOB SHAPIRO | |
| 6 ASHOK KUMAR | COLLEEN CUNNIFFE | |
| 7 BILL STINSON | | |
| 8 BOB BUTLER | | |
| 9 BOB SHAPIRO | | |
| 10 BRETT COWELL | | |
| 11 CAROLYN SMITH | | |
| 12 CATERING VZ BR | | |
| 13 CHARLIE FORAND | | |
| 14 COLLEEN CUNNIFFE | | |
| 15 CONFERENCE CTR VZ BR | | |
| 16 CRAIG REDING | | |
| 17 CRAIG YOUNG | | |
| 18 | | |
| 19 | | |
| 20 | | |

LAST

| | |
|---|---|
| 1 ALDREY, RAUL | ANDERGEGGEN, SUSAN |
| 2 ANDERGEGGEN, SUSAN | BOYLAN, JOHN |
| 3 ARUMUGAVELU, SHANKAR | CORNING, DAVE |
| 4 AZZAM, HAMMAD | COWELL, BRETT |

FROM FIG. 2A

5 AZZAM, MOHAMMAD
    6 BAIN, SCOTT
    7 BELL, TODD
    8 BILL, STINSON
    9 BOYLAN, JOHN
  10 BRADLEY, LAURETTE
  11 BUTLER, BOB
  12 CANETTI, SERGIO
  13 CAR SERVICE, GARDEN STATE A1
  14 CAR SERVICE, LIMOLINK
  15 CAR SERVICE, PLATINUM CAR
  16 CEFALU, SAL
  17 CORNING, DAVE
  18 COWELL, BRETT
  19 CRESPO, DIEGO
  20 CUNNIFFE, COLLEEN

PHONE

1 2145553886 HAMMAD - CELL
    2 2145554392 MOHAMMAD - CELL
    3 2015553313 JOHN - CELL
    4 2155553989 ANDREA - CELL
    5 2145555621 KAVOUSPOUR - CELL
    6 2155556160 TONY - CELL
    7 2145553274 FARI - CELL
    8 2145557346 MAHMOUD - CELL
    9 2145553213 KAMIL - CELL
  10 2155552866 SHARON - WORK
  11 2125551622 SHAYGAN - WORK
  12 2145558907 NOSH - WORK
  13 2145553249 MOHAN - CELL
  14 2145551590 HAZEM - CELL
  15 2155554761 ERIC - CELL
  16 2145552209 ZOUHAIR - CELL
  17 2145556816 ANIL - CELL
  18 2145552285 PETER - CELL
  19
  20

ADDRESS
CITY
STATE
COMPANY
EMAIL

PHONE DIALER WITH ADVANCED SEARCH FEATURE AND ASSOCIATED METHOD OF SEARCHING A DIRECTORY

BACKGROUND

While many communication devices such as conventional landline and cellular telephones include a keyboard for the input of a numeric telephone number, size constraints typically limit the number and arrangement of keys. Typically telephones include a small numeric or "touch tone" keypad or dial pad configured according to international standard ITU E.161 established by the International Telecommunications Union (ITU) and/or according to ISO 9995-8 established by the International Organization for Standardization. The keypad layout includes 12 keys representing numerals 0-9 and the symbols "*" (called the "star key" or "asterisk key") and the. "#" (called the "octothorpe", "number sign", "pound key", or "hash key".) The standards provide for the assignment of the 26 letters A-Z to the number keys of a numeric keypad in support of, among other things, the entry of alphabetic or "alpha" characters.

Because each key may represent a number in addition to three or four letters of, for example, the English alphabet, several technique have been used to determine the symbol (number or letter) that is being input or selected by a user. One method known as "multi-tap" requires that a user depress a key a number of times corresponding to the order (or "ordinality") of the letter being selected. In one such scheme, the keypad may be operated either in a numeric input mode in which each keystroke is interpreted as the corresponding number or in an alpha mode in which the number of times a key is depressed is used to determine the letter being input. Another method known as predictive text may use a dictionary to match a sequence of numeric inputs to corresponding numeric codes of dictionary entries. For example, the name "BOB" would correspond to a numeric sequence of 2-6-2.

The predictive method works relatively well for short text messages using a limited dictionary of words wherein ambiguity between dictionary entries based on their numeric equivalence is minimal. However, the predictive method is not as efficient when the dictionary includes many similar words and/or combinations of words and numbers. In such case, disambiguation between and among the various dictionary entries (e.g., listings in a directory) that are represented by the same sequence of keystrokes may become burdensome and limit system utility in providing a convenient user interface.

BRIEF DESCRIPTION OF THE SEVERAL VIEWS OF THE DRAWING(S)

The drawing figures depict preferred embodiments of the present invention by way of example, not by way of limitations. In the figures, like reference numerals refer to the same or similar elements.

FIGS. 2A-2B are diagrams illustrating a filtering technique for matching directory listings to a sequentially entered string of keypad inputs as those inputs are supplied;

REFERENCE TO A COMPACT DISK APPENDIX

Figure 1:
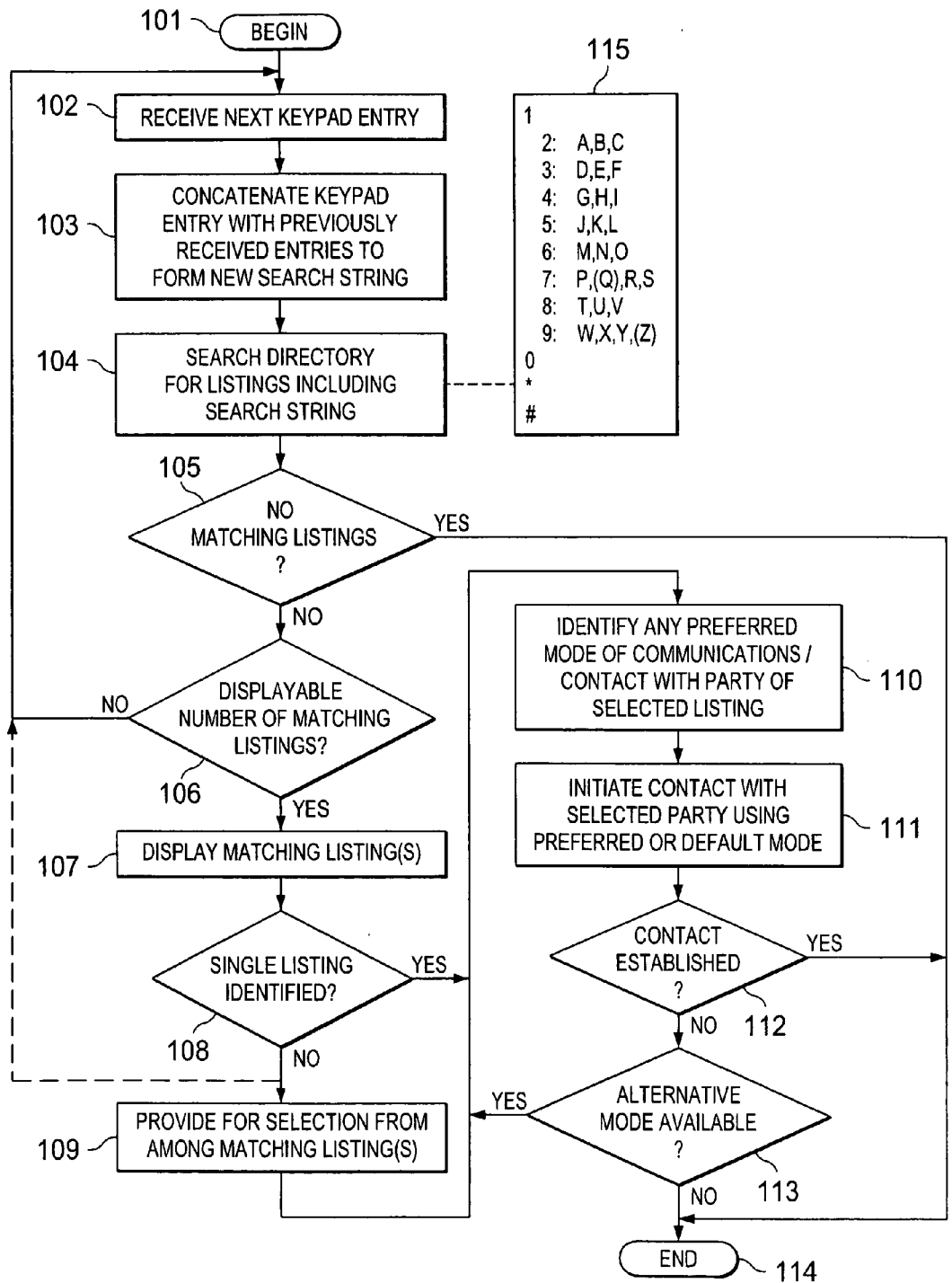
FIG. 1 is a flow diagram of a method of searching a directory for listings matching a string entered as a sequence keypad entries.

The ensuing description provides exemplary embodiments only, and is not intended to limit the scope, applicability, or configuration of the invention. Rather, the ensuing description of the exemplary embodiments will provide an enabling description for implementing an example embodiment of the invention. It should be understood that various changes may be made in the function and arrangement of elements without departing from the spirit and scope of the invention. These exemplary embodiments now will be described hereinafter with reference to the accompanying drawings, in which exemplary embodiments and examples are shown. Like numbers refer to like elements throughout.

An advanced dialing facility or device according to an embodiment provides a rolling search of contact entries across a combination of contact data, as well as the capability to switch between a traditional phone keypad interface and a traditional "qwerty" keyboard interface. These features, among other things, provide for the rapid selection of a party to be contacted and/or a particular telephone number by intelligently augmenting a keypad or keystroke input sequence with information contained in a directory. By implementing appropriate predictive and related search logic, a keystroke count required to identify a desired party is minimized. Combining information from a directory enhances the use of the limited number of keys provided by a conventional telephone keypad while minimizing the number of key-presses or key-touches required to place a call, send a message, etc. For example, upon selection of a key on a telephone keypad interface, contact data that may include any of the characters associated with the selected key may be displayed in a predetermined order. For a telephone keypad, this can include telephone numbers that include the number associated with the key, as well as contact names that include one or more of the letters associated with the key. Selection of additional keys may cause a further filtration of entries based on the numbers/letters associated with the key. As a result, users need not use abnormal entry patterns (such as multiple key-presses, e.g., a "multi-tap" technique) to specify contact names. Alternatively, the user may select a "qwerty" keyboard interface that may cause the telephone keypad to be replaced by a "qwerty" keyboard interface, allowing the user to enter letters in a manner to which most users are accustomed.

Embodiments are particularly useful with telephones (including but not limited to cell phones) that include contact databases in which telephone numbers, names and other information about contacts (e.g., directory listings including business name, title, address, profession, etc.) may be stored. These contact entries may be generated from caller ID information from calls received on the telephone, from contact databases that store contact information, and/or from manual entry of the contact information. A common problem with phone contact information is that it is often cumbersome to search for contact phone numbers by name since most telephones have only a standard 12-key phone keypad as an interface. As described, one way this problem is solved is by having the user perform multiple selections of a key, with the number of selections indicating the character which is desired (e.g., multi-tap). For example, if the letter "C" is desired, the phone keypad key with the characters "2", "A", "B" and "C" associated with it would be depressed 4 times in quick succession to indicate that a "C" was desired. This multi-tap type of interface is often difficult and time consuming for many users to manipulate.

An embodiment described herein includes an advanced search over all contact information accessible to the phone based on all possible character associations of a dialing keypad allowing for easy identifications of contacts of interest. Embodiment may further give a user the option of replacing the traditional dialing keypad with a "qwerty" keyboard.

As an example, a user may select a phone dialer interface which includes a search facility. When the user selects a key of the phone dialer user interface the system automatically filters the set of desired contacts to those contacts that either include the number associated with the selected key or include one or more of the letters associated with the selected key (e.g., as part of a first and/or last name associated with a listing and/or other descriptive information included as a searchable term or search key in the database listing such as business name, title, etc.). For example, if the user selects the "9" key, the system may filter on the number 9 and the letters "W", "X", "Y" and "Z", that are associated with the "9" key on the phone dialer. Contacts remaining after the filtering may be displayed, for example, with the contact name and phone number In some embodiments the filtration occurs immediately after the key is selected, such that the user immediately is presented with the contacts that meet the partial or complete criteria entered thus far. If a user selects another key of the phone dialer, further filtration is then applied to determine those contacts that include the characters and/or character string associated with the added key selection. The user may continue to select keys until the desired contact set is displayed and may then be able to select a contact directly from the interface to initiate a communication session.

Presentation of contacts in the user interface may be in any manner, such as alphabetical order. In some embodiments however, a placement heuristic is applied to the filtered set of contacts to determine the order in which the contacts are displayed to the user. For example, contacts where the last name begins with one of the associated letters may be placed higher than contacts which simply include one of the letters; contacts with phone numbers that start with the associated number may be placed higher than contacts that simply include the associated number, contacts where the first name begins with one of the associated letters may be placed higher than contacts which simply include one of the letters, contacts with two letters together may be placed higher than contacts which simply include two of the letters with etc. If more contacts are part of the filtered set than can be displayed on the user interface, navigation facilities may be provided (e.g., a scroll bar and/or arrows).

In embodiments where the user interface supports a "soft" interface, such as a telephone device having software definable keys and/or touch sensitive display, a further facility may be provided that allows the user to select between a phone dialer interface and a keyboard interface. According to one embodiment, a touch screen is provided on the phone device, and the phone dialer interface is provided using the touch screen. If the user desires to use a standard keyboard interface with one character per key, such as a "qwerty" type interface, the user can cause the interface shown on the touch screen to switch from the phone dialer interface to the keyboard interface. In some embodiments the user may switch between the phone dialer interface and the keyboard interface in the middle of a filtering operation, such that the previously filtered set of contacts is retained, and the keys selected by the user are added to the characters which are used for filtering.

The contacts searched for filtering may include the contacts stored on the phone including recent calling activity, manually entered contacts, and imported contacts, as well as contacts available through a network connection. The contact data that is subject to filtering in the example embodiment includes the phone number and contact first and last name, but may include other information such as a company name and/or email address.

Referring now to FIG. 1, a method of searching a directory of listings is therein depicted. Beginning at 101, an input using a keypad is received at 102. The input may then be concatenated at step 103 with any previously received entries to form a (new) search string. Typically the concatenated keypad entry will be formed by adding the newly received character from step 102 to the end of a character string to form a new character string. In this way, the character string is built as a user enters a multi-character input string keystroke-by-keystroke. At step 104 a search of a directory is conducted to identify listings that include the search string. As each keypad entry or keystroke may represent more then one character (e.g., a number plus three or four alpha characters or letters as shown in 115), a match may include translating a string of alpha characters present in the directory into a corresponding string of numbers or numeric values. Further, the search string may represent a string of the characters to be found which character string may be located at the beginning of a listing or, less preferably, internal to a listing. For example, a search string may be found at the beginning of a listing representing, for example, the last name of a party listed in the directory. Alternatively, a search string may be found constituting a portion of a name, as part of a first name, or within any other data associated with a listing such as the telephone number of a party. The search string may also be found in other available information fields associated with a party such as might be included in a contact field provided by a personal information manger and/or contact manager program such as Microsoft Outlook For example, in addition to a "contact's" name, a record may include searchable fields containing organizational affiliation (e.g., company name), profession, title, address, etc. Further, a search technique may include additional features to enhance prediction and/or to identify approximate matches (e.g., to accommodate misspellings, keypad entry errors, etc.).

A check is performed at 105 to determine if any of the listings in the directory match. If no matches are found, then processing may end at 114 or error processing (not shown) may be performed. If one or more listings are not excluded so that possible matches are identified within the directory then processing continues at 106. Step 106 is optional to determine if the number candidate matches fall within a displayable number of listings. That is, if the total number of candidate listings that include partial or complete matching of the search string entered so far are displayable then processing may continue at step 107 to display the complete list of candidate matches. According to an embodiment of the invention, narrowing the list to some small number "n" of displayable listings may be characterized as a search "success" since all matching or partial match results may be presented in the form of a list of n speed dial selections. If optional step 106 is implemented, then an alternate screen may be displayed in the event that the number of matching listings exceeds those displayable on a display screen. Alternatively, other options may be implemented (e.g., a scroll bar providing for the viewing of a number of match results exceeding that displayable in a single window.) For example, candidates maybe ranked and displayed in order of recency of contact and/or frequency of contact so that those parties most likely to be called may be displayed more prominently or displayed at the beginning of a list as opposed to those infrequently contacted. As another example, entries that are part of a favorites list may be ranked more highly and displayed in preference to listings that are not included and/or have not been accessed recently.

At step 108 a check may be performed to determine if multiple candidates are present that satisfy the search criteria received so far. If multiple candidates are identified then processing may loop back to the top of step 106 so that the user may input further keystrokes and thereby add to the search string. Processing may further continue at step 109 (in parallel or in response to no additional keystrokes being received) to display and provide a selection from among the matching listings. Again, the matching listings may be shown in various configurations depending on how the various listings are ranked. If only a single matching listing is found at 108, then processing may bypass step 109 and continue at step 110. At 110 a preferred mode of communications and/or method of contacting a selective party may be identified. This preferred mode of communication and or method of contacting the party may be determined based on several criteria including pre-stored information about the listing and may further include a ranking of multiple applicable modes (e.g., a preference to first use cell telephone number followed by home telephone number followed by email, etc.) that may be used to contact a particular party. A preferred mode may also be responsive to criteria such as the mode of communication most recently used to contact or when contacts by the selected party, the most often used mode of communication used to contact or when contact by the party etc.

At step 111 contact may be selectively initiated with the selected party using the preferred or a default mode of communication. If contact is established then processing ends at step 114. Alternatively, if contact with the selected party is not established, then a check is performed at 113 to determine if an alternative mode is available. If so, then the next preferred mode of contacting the party may be implemented by looping back to step 110. If no matching listings are found or if communications is established, processing ends at 114.

Referring to FIGS. 2A-2B, an example of a filtering method is illustrated. The diagram uses as an example a keystroke sequence corresponding to a targeted name "BOB", each letter heading one of three columns including the corresponding digit being dialed, the letters associated with that digit, the candidate listings of entries satisfying the portion of the search string inputted so far and the number of the entries out of a total directory size of 150 satisfying the criteria. The directory is shown, by way of example only, as including eight programmed speed dial entries listed as 1-8, a searchable first name field, a searchable last name field, and a searchable phone number field including an indication of whether that number phone is for a cellular device or a work telephone number (although other and/or additional contact information fields and/or designations may be included). Referring to the first letter of the targeted name "BOB", that being the initial "B", this letter corresponds to a dialed input key of "2" which may correspond to any/all of the letters A, B, and C. As a result of this initial input all entries having a first name or last name beginning with the letters "A", "B" or "C" are identified as potential matches as are all phone numbers beginning with the number "2". In the present example 55 out of a 150 total directory listings are identified, while 95 listings have been filter out and eliminated from the list of potential or candidate matches. Although this number is greater then 8 possible speed dials that may be displayed at one time, a prioritization scheme may be used to display and provide for the selection of the mostly highly ranked of the 55 listings identified. In the present example, the first eight listings matching the first names of respective directory listings are displayed at this initial step upon input of the initial letter "B". Upon receipt of the second keystroke using the "6" key representing the second letter "O" of the targeted name, additional filtering is performed so that the candidate list of matches including all names having a first letter of A, B, or C and second letter of M, N or O are included as are numbers starting with "26" (e.g., telephone numbers) and all others are eliminated. In the present example, this results in ten of the total of the 150 listings remaining, eight of the ten being displayed as potential speed dial selections. Again, some prioritization scheme may be used to display those names mostly likely to be selected. Upon receipt of the third keystroke using the keypad "2" button corresponding to the final letter of the targeted name "BOB" only two entries remain corresponding to parties having the first name of "BOB." Since only two potential matches are identified, these two entries are displayed and associated with corresponding speed dial accesses for selection by the user and dialing by the system.

Figure 3:
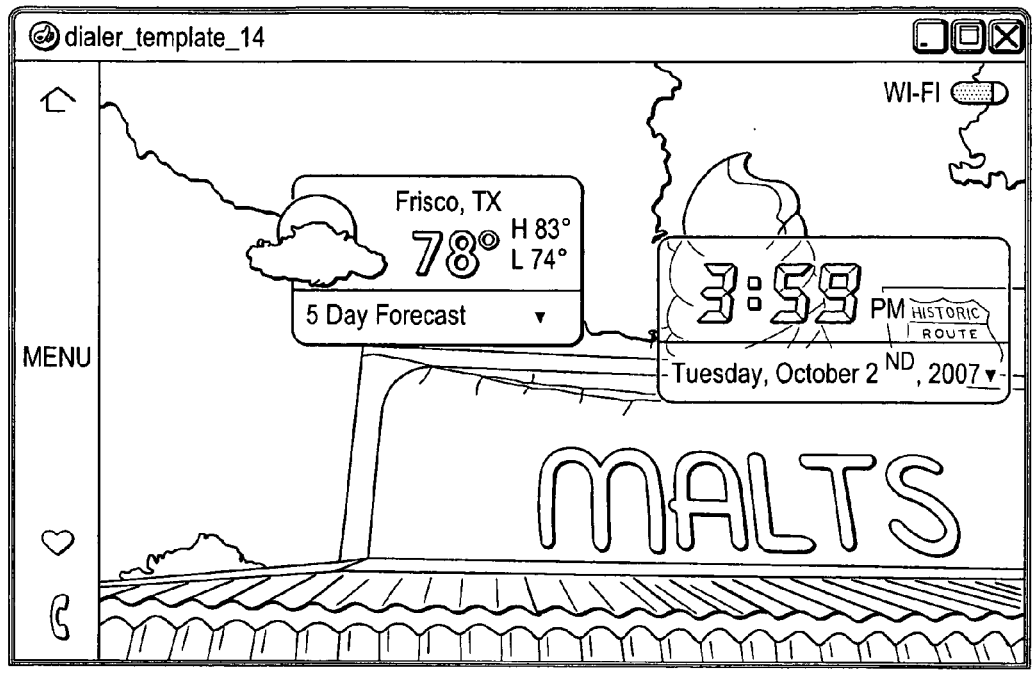
FIG. 3 is a screenshot illustrating a home screen of an advanced telephone device.
Figure 4:
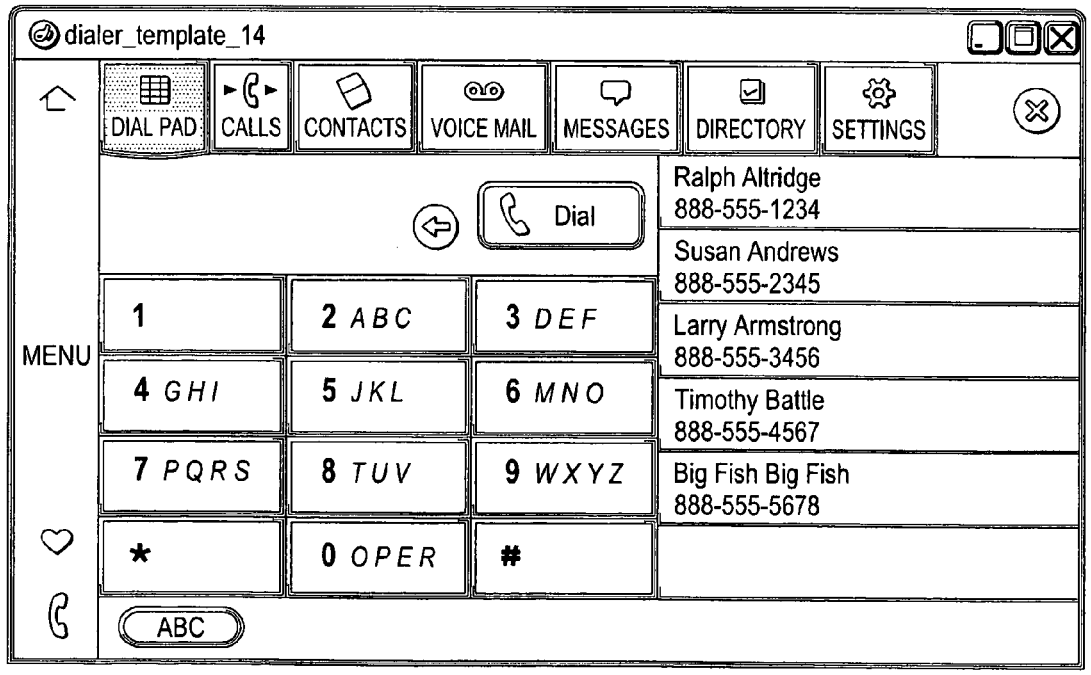
FIG. 4 is a screenshot of a dial pad display of an advanced telephone device.

Screenshots according to an embodiment of the invention are shown in FIGS. 3-16. Thus, FIG. 3 is a home or a splash screen that may be displayed on a telephone device including a advanced telephone and/or a cellular telephone. Access to various functions may be provided by a touch screen feature whereby a menu may be accessed by touching the menu icon on the left portion of the screen. In response to selection of the menu option a screen such as shown in FIG. 4 may be displayed including a initial window representing a telephone dial pad or keypad. Other options may be selected using virtual buttons displayed along the top of the display in the form of a menu including "dial pad", "calls", "contacts", "voicemail", "messages", "directory", and "settings". Referring to FIG. 4, a typical 12 button keypad may be displayed in the lower left quadrant of the figure together with various speed dial entries (e.g., favorites) that may be displayed along the right portion of the screen.

Figure 5:
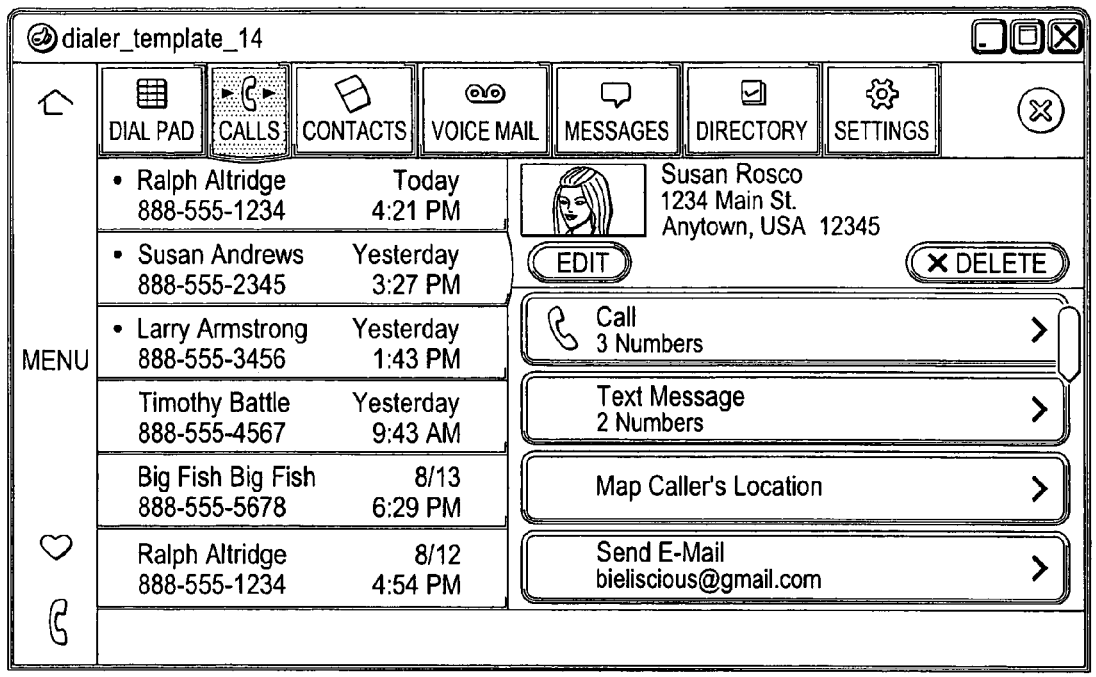
FIG. 5 is a screenshot of a display showing calls placed and/or received using an advanced telephone device.

FIG. 5 is a screenshot of a "calls" menu displaying a listing of recently made and/or received calls from various parties with options for obtaining additional information about the calls and/or text messages, map locations, or the option to send an email to the caller provided by a menu along the right hand portion of the screen.

Figure 6:
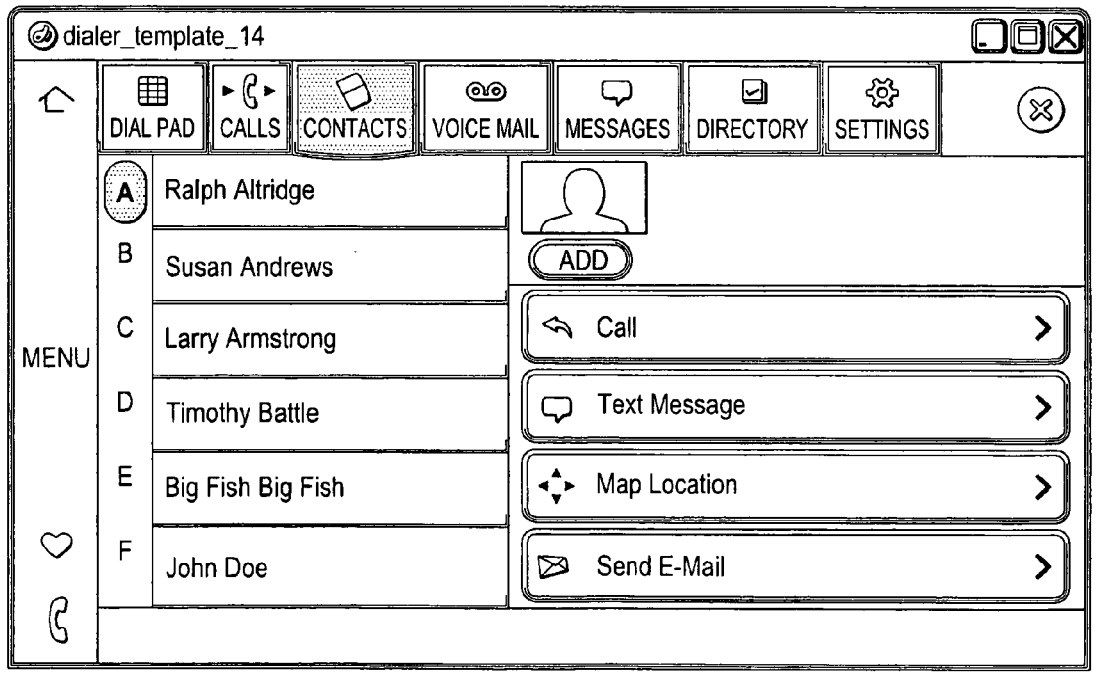
FIG. 6 is a screenshot of a contact screen displaying listings of a directory stored in a memory of an advanced telephone device.

FIG. 6 is a screenshot showing a list of contacts stored in a directory.

Figure 7:
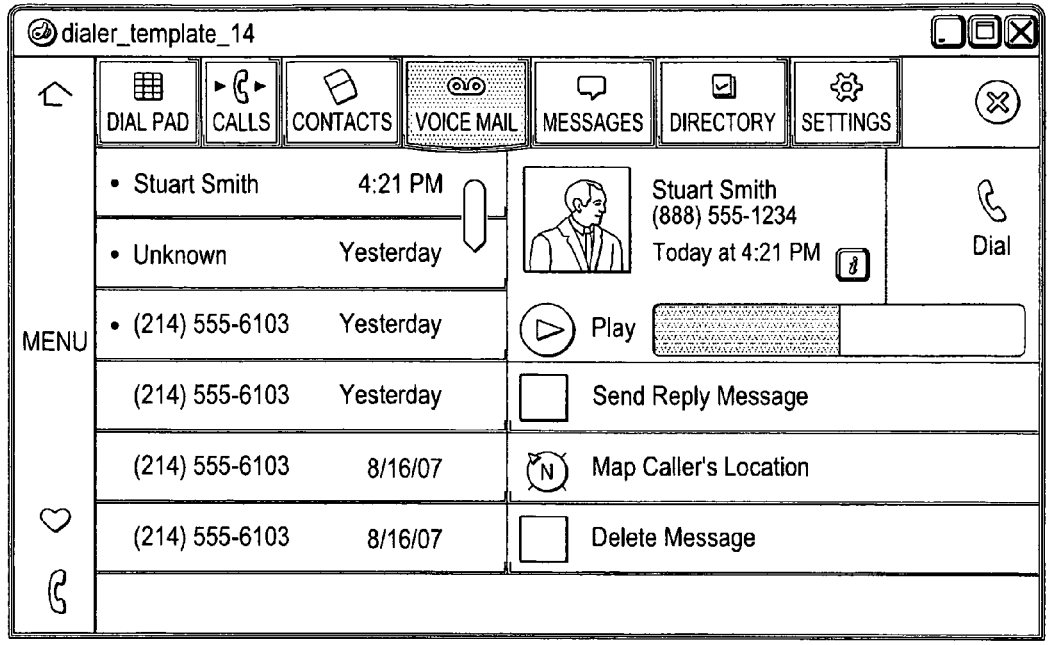
FIG. 7 is a screenshot of a voice mail screen of an advanced telephone device.

FIG. 7 is a screenshot including a listing of voicemail received and control options for playing the voicemail, sending a reply message, mapping the callers location, or deleting the message according to a menu and controls provide on the right hand portion of the screen. Another portion of the screen may provide further details about a selected voicemail such as the name and phone number of the caller, a picture of the caller, etc.

Figure 8:
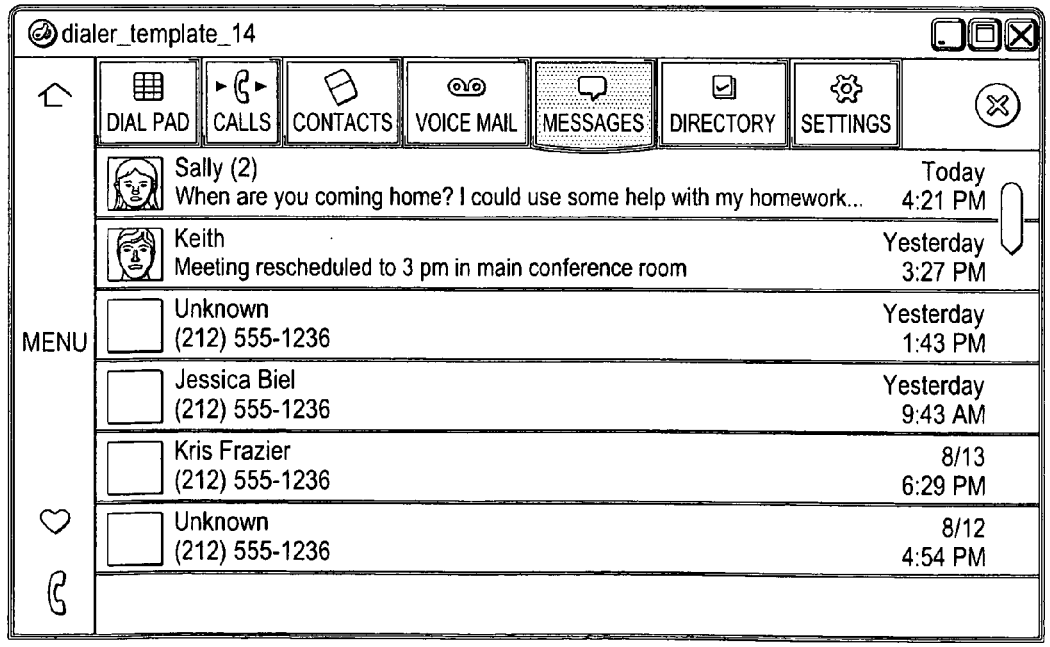
FIG. 8 is a screenshot of a messages screen of an advanced telephone device.

FIG. 8 is a screenshot of a messages menu that may include test messages, SMS messages, etc.

Figure 9:
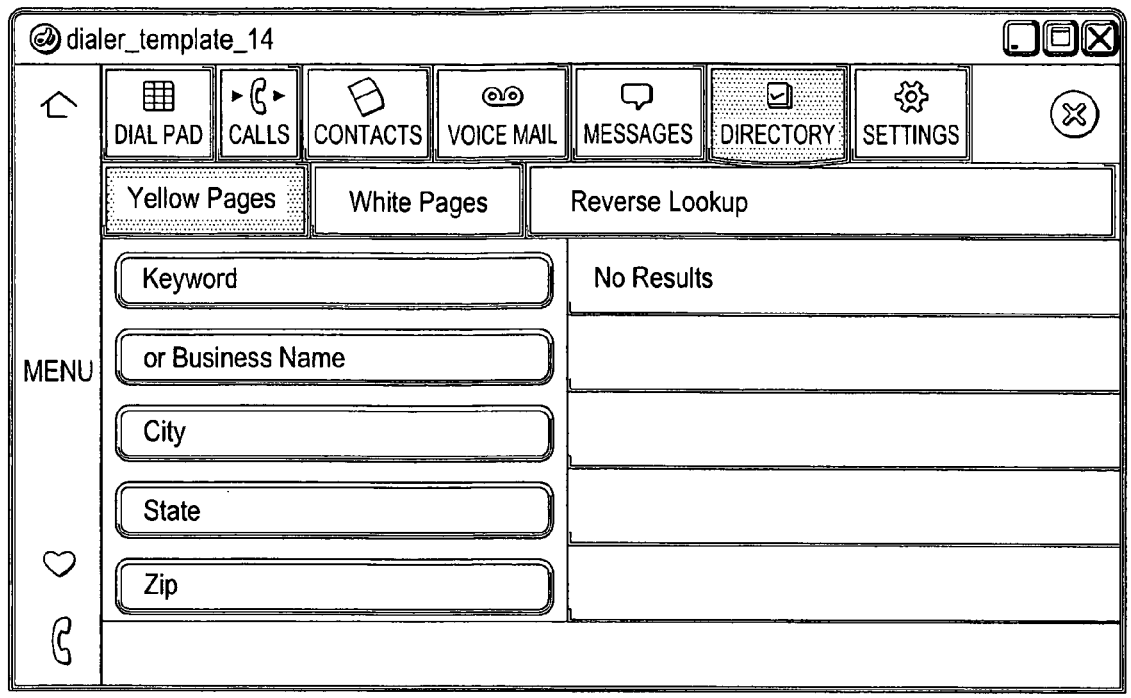
FIG. 9 is a screenshot of a directory screen of an advanced telephone device.

FIG. 9 is a screenshot of a directory menu that may be used to search and/or enter information into a directory.

Figure 10:
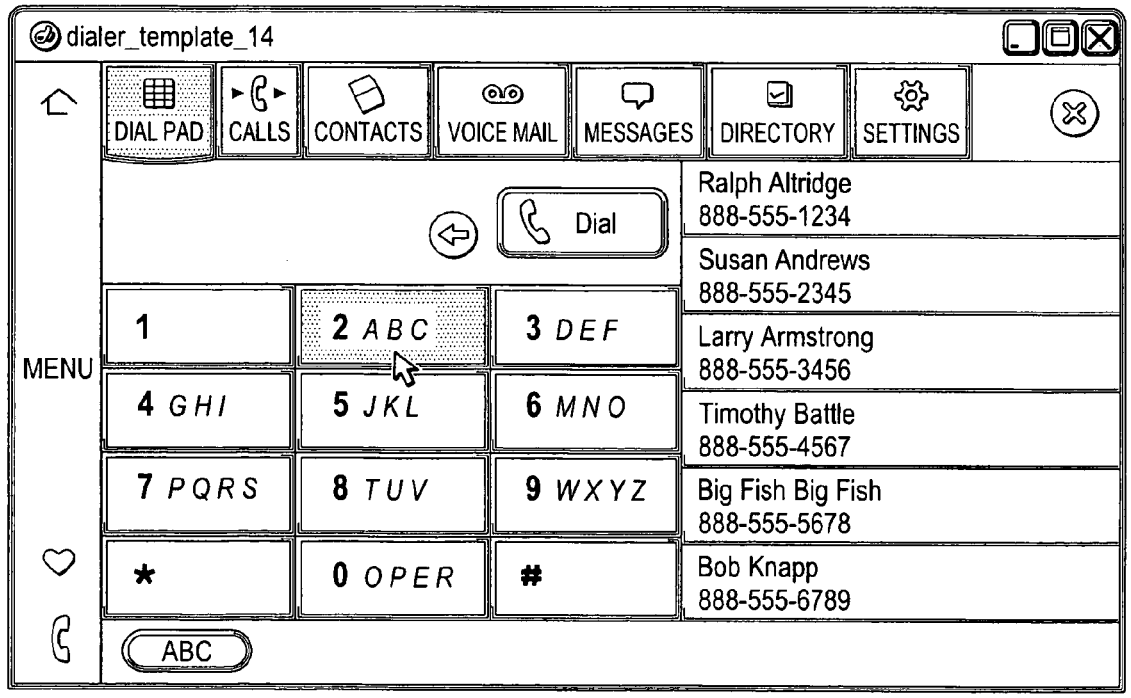
FIGS. 10-16 are a sequence of dial pad screens illustrating a predictive method of identifying match candidates among listings of a directory stored in an advanced telephone device.
Figure 11:
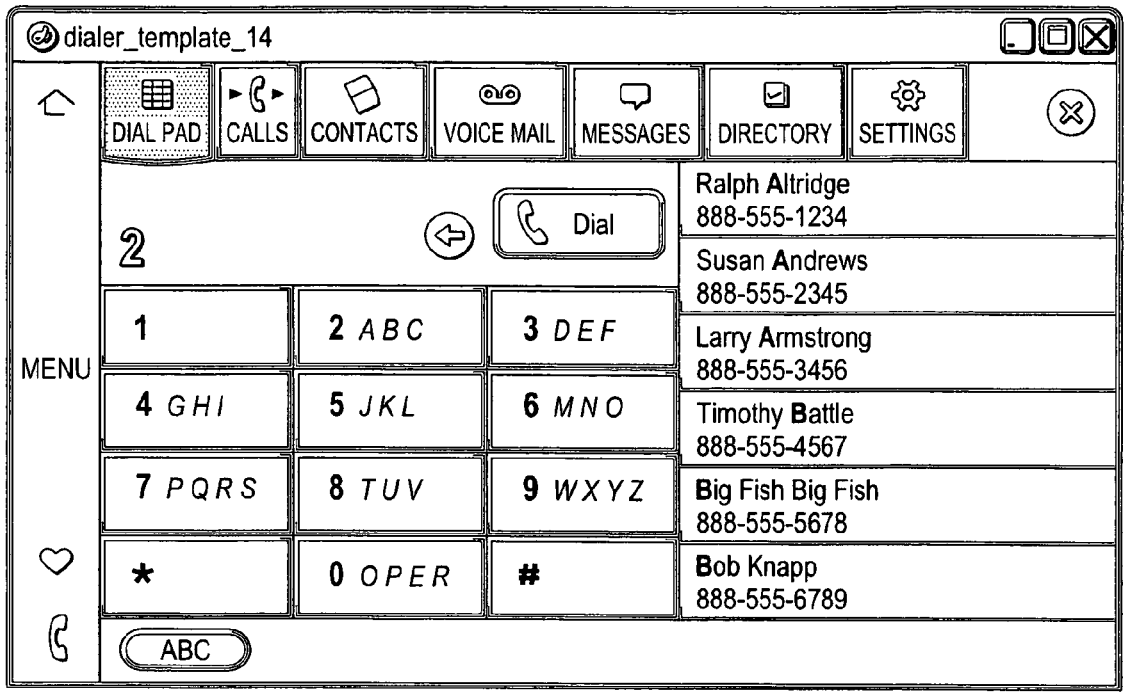
Figure 12:
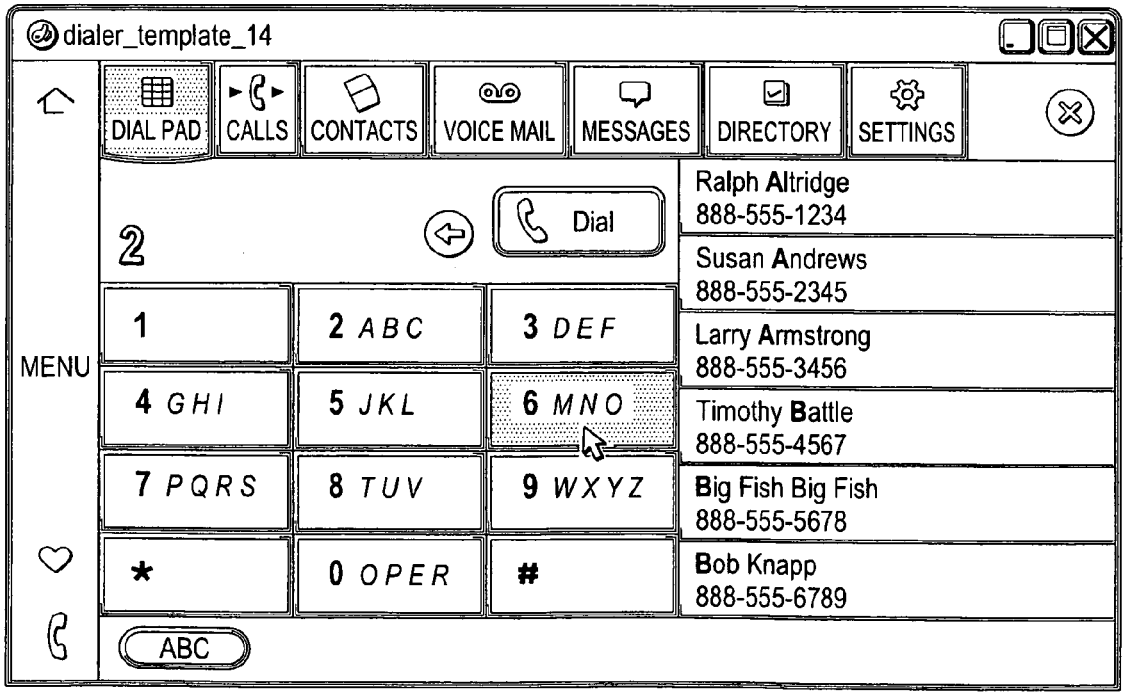
Figure 13:
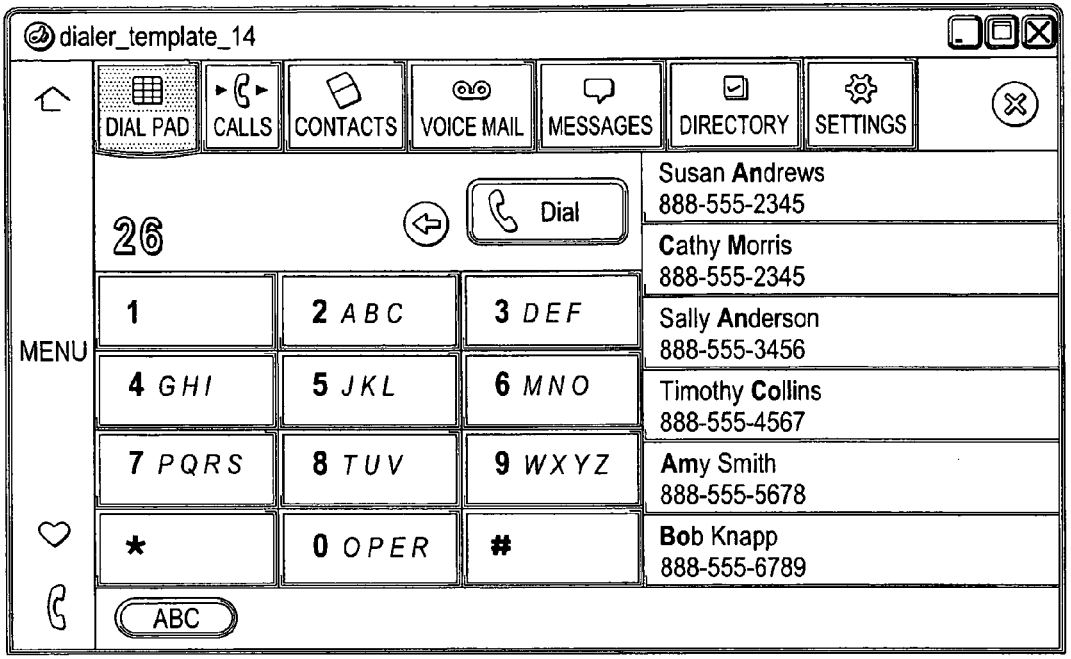
Figure 14:
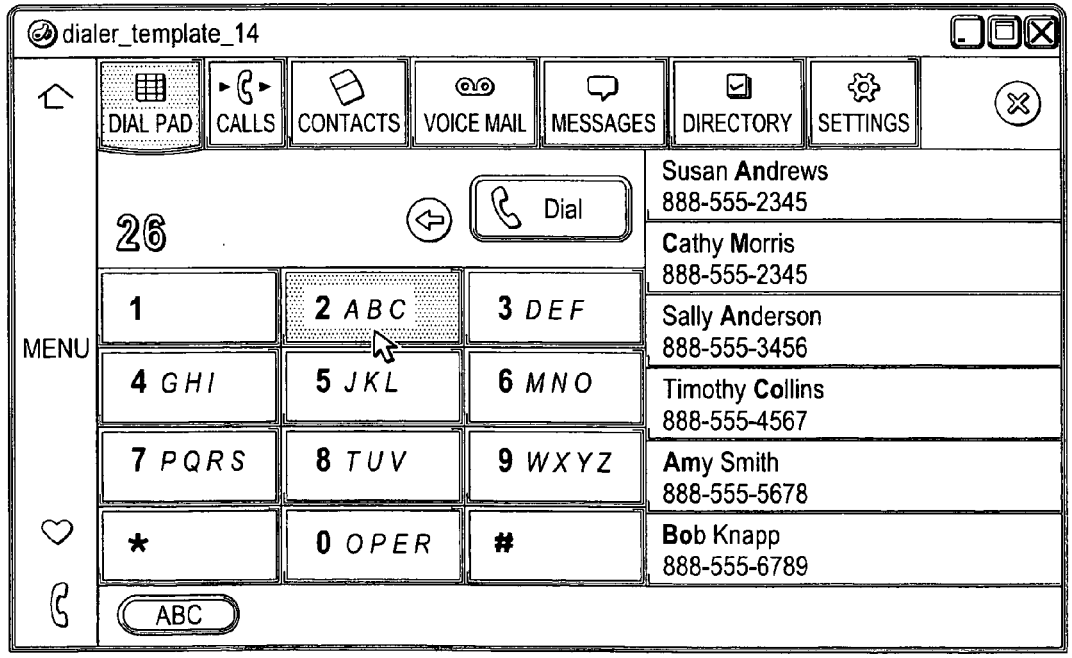
Figure 15:
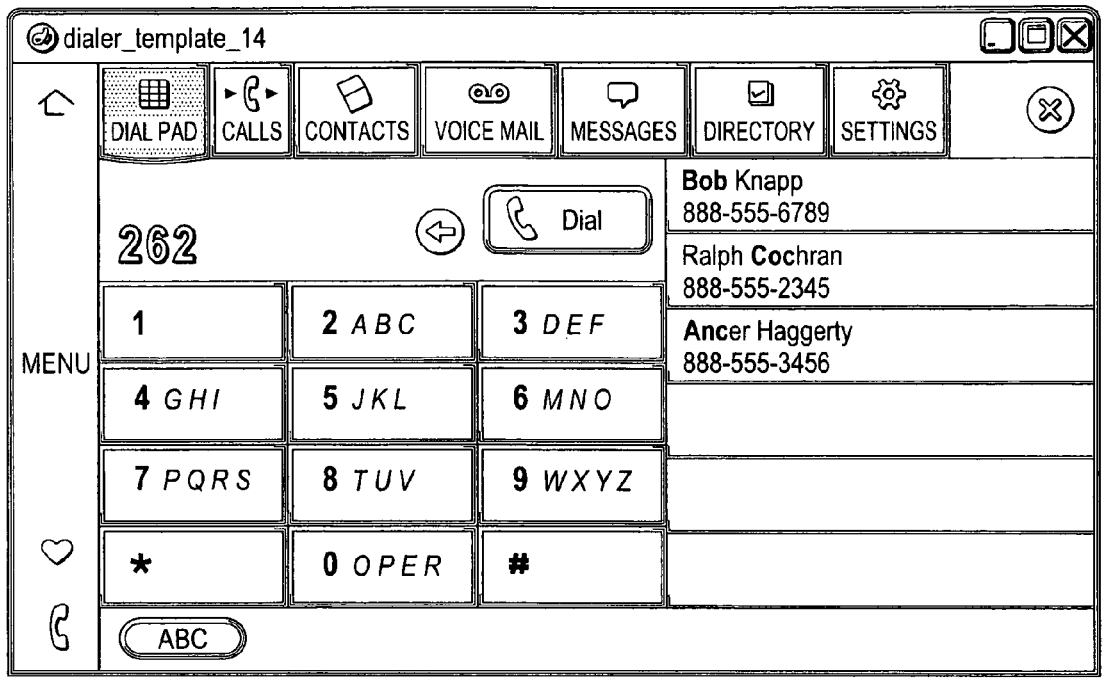
Figure 16:
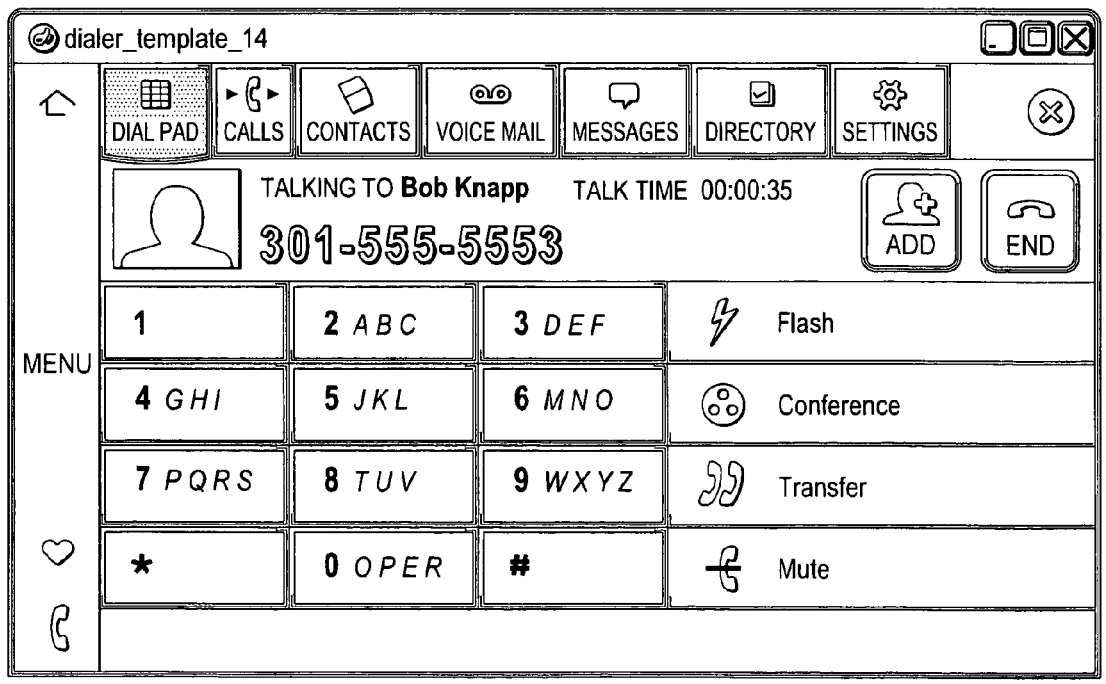

FIGS. 10-16 are a series of screenshots corresponding to the sequence of inputs illustrated in connection with FIG. 2. Referring to FIG. 10, a user selects the "2" button resulting in the display of that number at FIG. 11 and the filtering of listings from the directory so that only those have a telephone number beginning with the number "2" or a first or second name beginning with the letters A, B, or C remain as potential matches. In the present illustrative example only six speed dials are accommodated although any number of speed dials may be provided, the first six matches in lexographical being displayed. Again, other criteria may be used to rank and display the most likely candidate listings for display. Referring to FIG. 12, the user selects the "6" key corresponding to the letter "O" of the name "BOB" so that, a FIG. 13, the number six is displayed and additional filtering is performed so that only telephone numbers beginning with the number "2-6" and names having a first letter of A, B, or C and second letter of M, N, O are displayed. Referring to FIG. 14 the user inputs the final letter by depressing the number 2 such that at FIG. 15 the number 2 is displayed and additional filtering provides three potential matches, in the present case, listings of parties whose first names all are "BOB". Upon selection of one of those names, contact with the selected party is initiated as depicted in FIG. 16 by, for example, dialing that number and attempting to provide a telephone connection with the selected party.

Figure 17:
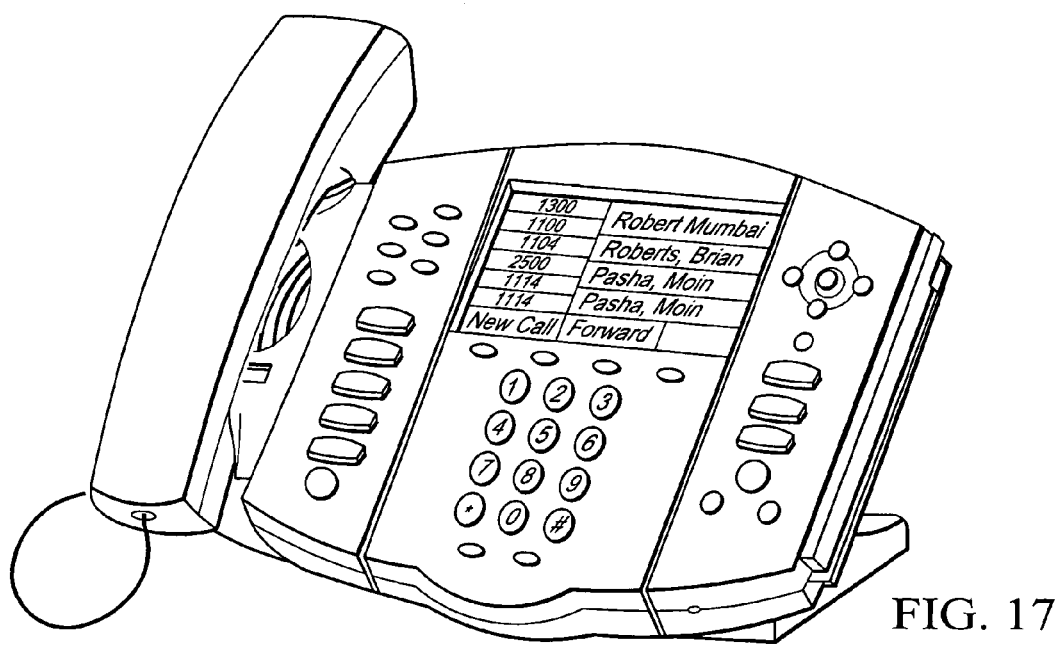
FIG. 17 is an example of a landline telephone compatible with embodiments of a dialer as described herein.
Figure 18:
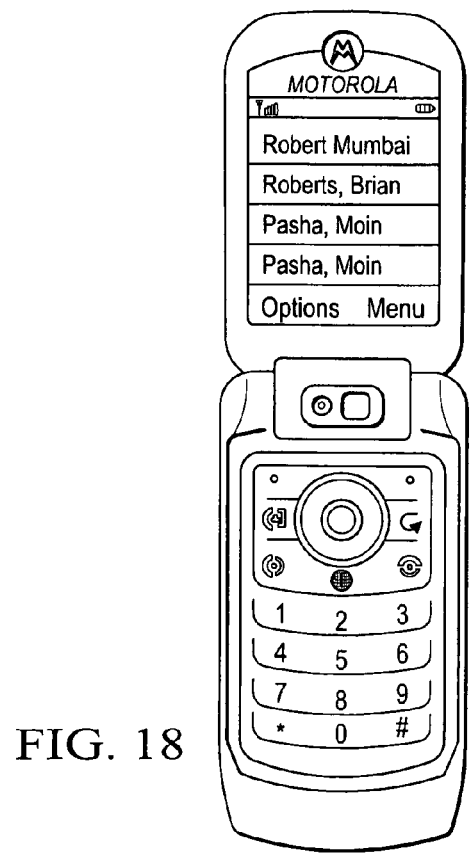
FIG. 18 is an example of a cellular telephone compatible with embodiments of a dialer as described herein.

FIG. 17 depicts an example of a landline telephone compatible with embodiments of a dialer as described herein including a display screen and keypad. Likewise, FIG. 18 depicts an example of a cellular telephone compatible with embodiments of a dialer as described herein, again including a display screen and keypad.

It is understood that the operations described for FIGS. 1-16 may be performed through hardware, software, or combination thereof. Therefore embodiments may take the form of hardware systems and/or apparatuses, software, or combinations thereof. As an example, embodiments may include a computer program product that includes a computer-readable storage medium (e.g., memory) and one or more executable portions (e.g., software) stored by the computer-readable storage medium for performing the operations described herein upon execution thereof.

In the preceding specification, various embodiments of the claimed invention have been described. It will, however, be evident that various modifications and changes may be made thereunto without departing from the broader spirit and scope of the invention as set forth in the claims that follow. The specification and drawings are accordingly to be regarded in an illustrative rather than restrictive sense. In addition, reference in the specification to "one example," "an example," "one embodiment," or "an embodiment" means that a particular feature, structure, or characteristic described in connection with the example is included in at least one example. The phrase "in one example" in various places in the specification does not necessarily refer to the same example each time it appears. All terms used in the claims are intended to be given their broadest reasonable constructions and their ordinary meanings unless an explicit indication to the contrary in made herein. In particular, use of the singular articles such as "a," "the," "said," etc. should be read to recite one or more of the indicated elements unless a claim recites an explicit limitation to the contrary.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

The invention claimed is:

1. A method comprising the steps of:
    storing a plurality of directory listings comprising a plurality of names and network addresses, each directory listing included in said plurality of directory listings searchable by a plurality of keys included in a telephone keypad, each of said keys comprising a plurality of symbols selected from a subset of an alphabet;
    receiving a first user input representative of a selected key among said plurality of keys to initiate a rolling search of said directory listings;
    identifying, in response to said first user input, one or more directory listings included in said plurality of directory listings that begin with one of said symbols on said selected key; and
    displaying, in response to said first user input, data representing said identified one or more directory listings within a user interface.

2. The method according to claim 1 wherein said step of displaying is in response to said number of identified directory listings being equal to or less than a maximum displayable number of listings.

3. The method according to claim 1 wherein each of said directory listings is searchable by at least one of the names and the network addresses.

4. The method according to claim 1 wherein said network addresses are selected from the group consisting of telephone numbers, email addresses, Internet Protocol (IP) address, and Uniform Resource Locator (URL).

5. The method according to claim 1 wherein each of said keys comprises a defined set of at least one numeric symbol and two alphabetic symbols.

6. The method according to claim 1 wherein the plurality of keys comprises at least ten keys, said ten keys respectively associated with the set of symbols including {1}, {2, A, B, C}, {3, D, E, F}, {4, G, H, I}, {5, J, K, L}, {6, M, N, O}, {7, P, R, S}, {8, T, U, V}, {9, W, X, Y} and {0}.

7. The method according to claim 1 further comprising continuing to receive a sequence of one or more additional user inputs representative of one or more additional selected keys until a single directory listing included in the plurality of directory listings is unambiguously identified.

8. The method according to claim 1 wherein said step of displaying data representing said identified one or more directory listings within the user interface includes ordering said one or more directory listings within the user interface based on a recency of access.

9. The method according to claim 1 wherein said step of displaying data representing said identified one or more directory listings within the user interface includes ordering said one or more directory listings based on a number of calls made to respective ones of said directory listings.

10. The method according to claim 1 further comprising steps of associating a preferred contact mode with each of said directory listings and supplying a network address associated with each of said preferred contact modes.

11. The method according to claim 10 wherein said preferred contact modes are selected from the group consisting of landline telephone, home telephone, office telephone, cellular telephone, email, instant messaging and voice mail.

12. The method according to claim 10 further comprising a step of initiating contact with a party associated with a selected directory listing using said preferred contact mode.

13. An apparatus comprising:
a memory storing a plurality of directory listings comprising a plurality of names and network addresses, each directory listing included in the plurality of directory listings searchable by a plurality of keys, each of said keys comprising a plurality of symbols selected from a subset of an alphabet;
a keypad manually operable for receiving a first user input representative of a selected key among the plurality of keys to initiate a rolling search of said directory listings;
a processor configured to identify, in response to said first user input, one or more directory listings included in said plurality of directory listings that begin with one of said symbols on said selected key; and
a display configured to display, in response to said first user input, data representing said identified one or more directory listings with a user interface.

14. The apparatus according to claim 13 wherein said display is responsive to said number of identified directory listings being equal to or less than a maximum displayable number of listings.

15. The apparatus according to claim 13 wherein said processor is further configured to associate a preferred contact mode with each of said directory listings and supply a network address associated with each of said preferred contact modes.

16. The apparatus according to claim 15 wherein said network address is a telephone number or email address and said preferred contact modes are selected from the group consisting of home telephone, office telephone, cellular telephone, email, instant messaging and voice mail.

17. A computer program product comprising at least one computer-readable storage medium having computer-readable program code portions stored therein, the computer-readable program code portions comprising:
a first executable portion for storing a plurality of directory listings comprising a plurality of names and network addresses, each directory listing included in the plurality of directory listings searchable by a plurality of keys included in a telephone keypad, each of said keys comprising a plurality of symbols selected from a subset of an alphabet;
a second executable portion for receiving a first user input representative of a selected key among the plurality of keys to initiate a rolling search of said directory listings;
a third executable portion for identifying, in response to said first user input, one or more directory listings in said plurality of directory listings that begin with one of said symbols on said selected key;
a fourth executable portion for displaying, in response to said first user input, data representing the identified one or more directory listings within a user interface.

18. The method of claim 1, further comprising applying a placement heuristic to the identified one or more directory listings to determine a placement of the identified one or more directory listings within the user interface.

19. The method of claim 18, wherein said identified one or more directory listings comprise a plurality of identified directory listings, and wherein the placement heuristic is configured to place one or more of the identified directory listings that include a last name that begins with one of said symbols on said selected key higher within the user interface than one or more of the identified directory listings that do not include a last name that begins with one of said symbols on said selected key.

20. The method of claim 1, further comprising:
receiving a second user input representative of another selected key among said plurality of keys;
identifying a filtered set of one or more directory listings included in the plurality of directory listings that begin with at least one of the symbols represented by the first user input followed by at least one of the symbols represented by the second user input; and
displaying data representative of the filtered set of one or more directory listings in place of the data representative of the identified one or more directory listings within the user interface.

* * * * *